United States Patent
Nakamura et al.

(10) Patent No.: US 11,061,444 B2
(45) Date of Patent: Jul. 13, 2021

(54) PORTABLE INFORMATION DEVICE

(71) Applicant: LENOVO (SINGAPORE) PTE. LTD., Singapore (SG)

(72) Inventors: Fusanobu Nakamura, Kanagawa (JP); Mitsuhiro Yamazaki, Kanagawa (JP); Hiroshi Itoh, Kanagawa (JP); Atsushi Nagashima, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/747,255

(22) Filed: Jan. 20, 2020

(65) Prior Publication Data

US 2020/0241604 A1 Jul. 30, 2020

(30) Foreign Application Priority Data

Jan. 24, 2019 (JP) .............................. JP2019-10164

(51) Int. Cl.
*G06F 1/16* (2006.01)
(52) U.S. Cl.
CPC ............ *G06F 1/1681* (2013.01); *G06F 1/162* (2013.01); *G06F 1/1618* (2013.01)
(58) Field of Classification Search
CPC ...... G06F 1/1681; G06F 1/1649; G06F 1/162; G06F 1/1616; G06F 1/1618
USPC ............. 361/679.26, 679.27, 679.55, 679.56
See application file for complete search history.

(56) References Cited

U.S. PATENT DOCUMENTS

| 9,176,535 | B2 * | 11/2015 | Bohn | H04M 1/0268 |
| 9,840,861 | B1 * | 12/2017 | Maatta | E05D 1/00 |
| 2016/0179236 | A1 * | 6/2016 | Shin | G06F 1/1616 |
| | | | | 345/173 |
| 2018/0210513 | A1 * | 7/2018 | Lin | H04B 1/3888 |
| 2018/0324964 | A1 * | 11/2018 | Yoo | E05D 3/18 |
| 2018/0341295 | A1 * | 11/2018 | Lan | G06F 1/1681 |
| 2019/0346889 | A1 * | 11/2019 | Chen | G06F 1/1616 |
| 2020/0097051 | A1 * | 3/2020 | Liu | G06F 1/1681 |
| 2020/0253068 | A1 * | 8/2020 | Cha | H05K 5/0226 |

FOREIGN PATENT DOCUMENTS

| JP | 6023228 B2 | 11/2016 |
| JP | 2018-031884 A | 3/2018 |

* cited by examiner

*Primary Examiner* — Anthony Q Edwards
(74) *Attorney, Agent, or Firm* — Antony P. Ng; Russell Ng PLLC

(57) ABSTRACT

A portable information device is disclosed. The portable information device includes a first chassis having a first display, a second chassis having a second display, and a hinge mechanism rotatably couples the first chassis to the second chassis. The hinge mechanism includes a set of hinge shafts with axial directions provided along an aligning direction of the first and second chassis, a slide support part supported by the first chassis to be slidable along the aligning direction to support a first one of the hinge shafts closest to the first chassis in a manner to be relatively rotatable, and a fixed support part fixed to the second chassis to support a second one of the hinge shafts closest to the second chassis in a manner to be relatively rotatable.

16 Claims, 14 Drawing Sheets

PORTABLE INFORMATION DEVICE

PRIORITY CLAIM

The present application claims benefit of priority under 35 U.S.C. §§ 120, 365 to the previously filed Japanese Patent Application No. JP2019-10164 with a priority date of Jan. 24, 2019, which is incorporated by reference herein.

TECHNICAL FIELD

The present invention relates to portable information devices in general, and in particular to a portable information device having at least a pair of chassis rotatably coupled by a hinge mechanism.

BACKGROUND

In recent years, portable information devices such as tablet personal computers (PCs) or smartphones having a touch panel-type liquid crystal display without any physical keyboard has been becoming more popular. The display of this type of portable information devices is desirable to be large when being used but compact when being carried.

For a conventional portable information device, a chassis can be made compact by closing the chassis when being carried or stored, and the chassis can be placed flat when being used so that two displays can be used as one large screen.

A hinge shaft is arranged at the center of each chassis in the thickness direction thereof. Since the hinge shaft does not overhang on the surface of the chassis, the chassis can be made thinner. Further, the portable information device can be changed in a variety of use modes by rotating the chassis from 0-degree position to a 360-degree position. However, adjacent end faces of respective chassis are formed in arc shapes from a side view in order to avoid interference during rotation. This forms a large gap between the two displays, and hence when the two displays are used as one large screen, a wide divided portion is formed at the center of the display screen.

On the other hand, since a hinge shaft is arranged on the surfaces of respective chassis, adjacent end faces of respective chassis can be formed into planes. This can make a gap formed between two displays small, and hence when the two displays are used as one large screen, the divided portion can be made smaller. In this structure, however, since an uneven shape of the hinge is formed on the surfaces of the chassis, the chassis are thickened.

Consequently, it would be desirable to provide an improved portable information device having a thinner chassis and a gap between the displays reduced.

SUMMARY

In accordance with an embodiment of the present disclosure, a portable information device includes a first chassis having a first display, a second chassis having a second display, and a hinge mechanism rotatably couples the first chassis to the second chassis. The hinge mechanism includes a set of hinge shafts with axial directions provided along an aligning direction of the first and second chassis, a slide support part supported by the first chassis to be slidable along the aligning direction to support a first one of the hinge shafts closest to the first chassis in a manner to be relatively rotatable, and a fixed support part fixed to the second chassis to support a second one of the hinge shafts closest to the second chassis in a manner to be relatively rotatable.

With the above-mentioned configuration, the hinge mechanism can be slid properly according to the angular position between the first and second chassis to set the chassis in positions to come close to each other or to be separated from each other. Therefore, in the flat plate form, the chassis can be made to come close to each other to make the adjacent edges of the displays provided on the respective chassis closest to each other, enabling a reduction of a gap between the displays. Thus, the displays can be used as one large screen without discomfort. Further, when the flat plate form is changed to the folded form, the hinge mechanism is made to slide so as to separate the chassis, thus enabling smooth rotation of the chassis without interference with each other. Moreover, since the hinge mechanism has a slide structure in the portable information device, there is no need to arrange the hinge mechanism on the surface of the chassis, and hence the chassis can be made substantially thinner.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
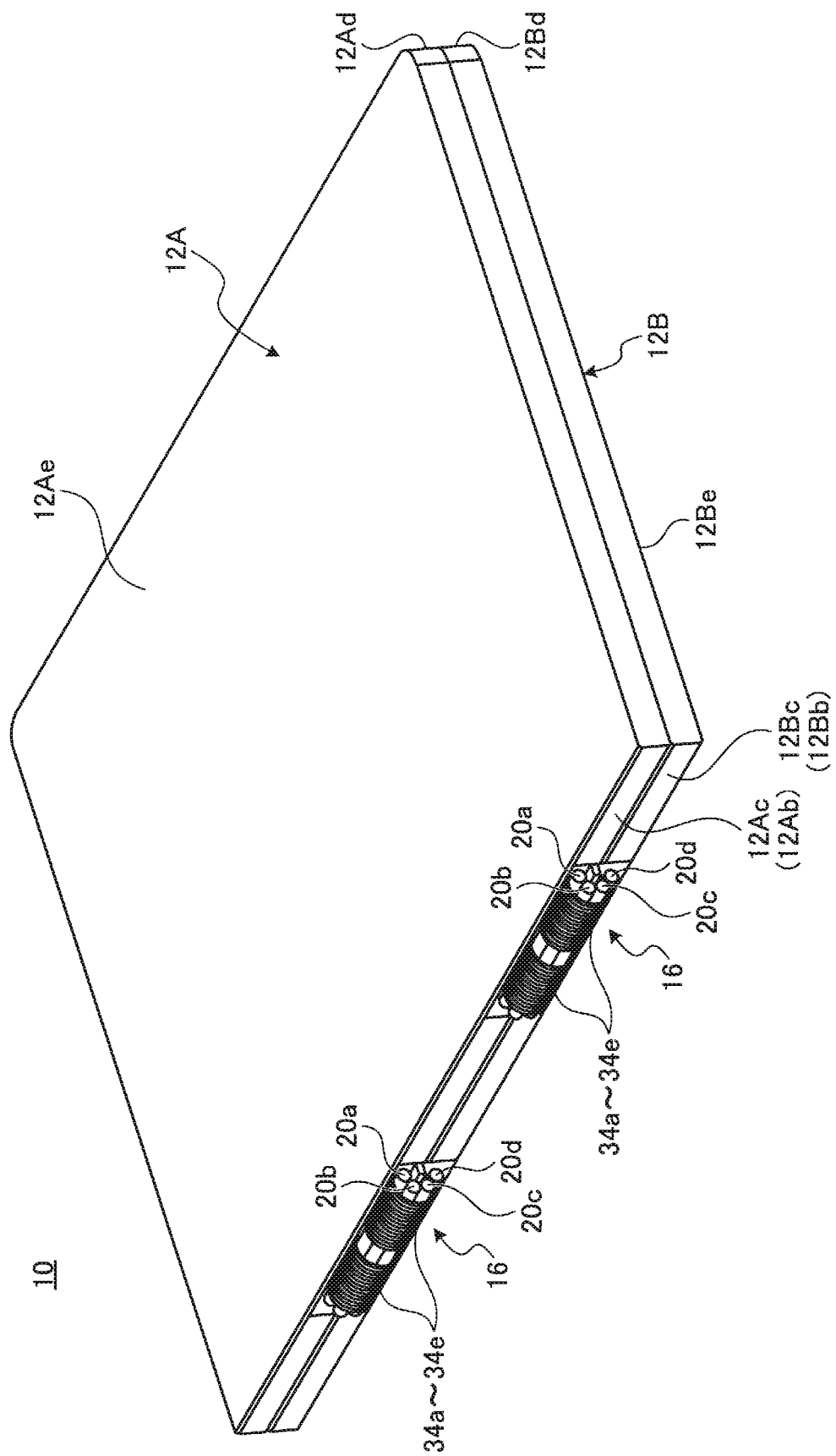
FIG. 1 is a perspective view of a portable information device, according to one embodiment.
Figure 2:
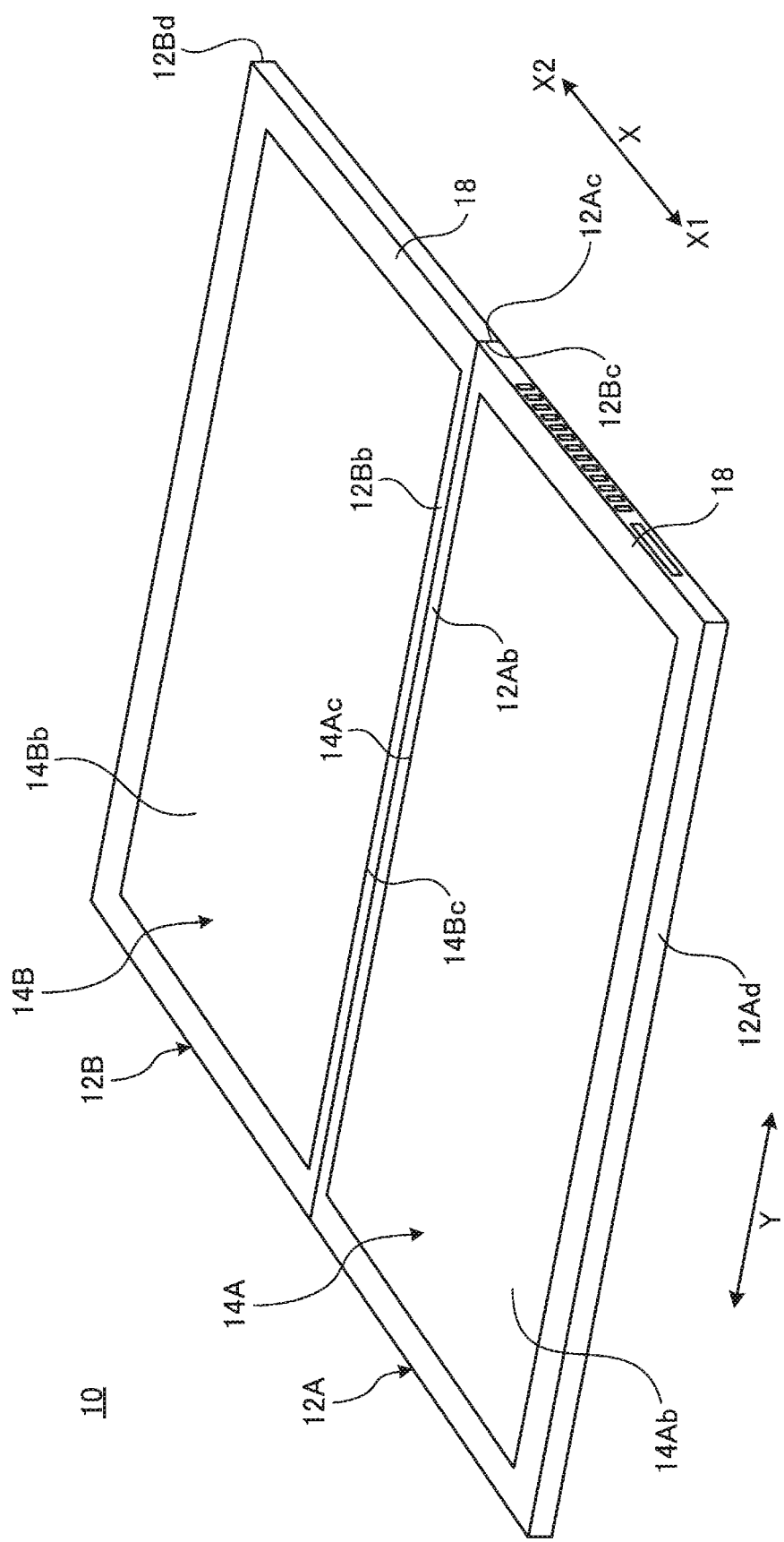
FIG. 2 is a perspective view of a state where the portable information device from FIG. 1 is open.

FIG. 1 is a perspective view of a portable information device 10, according to one embodiment. FIG. 2 is a perspective view of a state where the portable information device 10 is open. As illustrated in FIG. 1 and FIG. 2, the portable information device 10 includes a pair of chassis 12A, 12B, a pair of displays 14A, 14B, and a pair of hinge mechanisms 16, 16. In the embodiment, a tablet personal computer (PC) foldable in half like a book is exemplified as the portable information device 10. The portable information device 10 may also be a mobile phone, a smartphone, or an electronic notebook.

Each of the chassis 12A, 12B is a rectangular plate-like member having side walls formed to stand up around four peripheral edges, respectively. Each of the chassis 12A, 12B is formed from a metal plate made of stainless, magnesium, or aluminum, or from a fiber reinforced resin plate containing a reinforcing fiber such as a carbon fiber. The displays 14A, 14B are mounted on the inner surfaces 12Aa, 12Ba of the chassis 12A, 12B, respectively (also see FIG. 10). Various electronic parts 17 such as an arithmetic unit and a memory, are stored between the inner surfaces of the chassis 12A, 12B and the bottom surfaces of the displays 14A, 14B (see FIG. 10).

As illustrated in FIG. 1 and FIG. 2, one edge 12Ab of the chassis 12A with the display 14A mounted thereon and one edge 12Bb of the chassis 12B with the display 14B mounted thereon are rotatably coupled by the pair of hinge mechanisms 16, 16. The pair of hinge mechanisms 16, 16 of the embodiment are provided side by side in the longitudinal direction of the edges 12Ab, 12Bb. In the chassis 12A, 12B, end faces 12Ac, 12Bc of the edges 12Ab, 12Bb are formed flat. These end faces 12Ac, 12Bc abut each other to face each other in such a state that the chassis 12A, 12B are open (see FIG. 2). As a result, the chassis 12A, 12B are formed in the shape of one plate to substantially integrate the displays 14A, 14B so as to form a large screen.

The displays 14A, 14B are, for example, touch panel-type liquid crystal displays. Each of the outer peripheral edges of surfaces 14Ab, 14Bb of the displays 14A, 14B as display surfaces is surrounded by a bezel member 18. The bezel member 18 is particularly narrower in portions along the edges 12Ab, 12Bb, respectively. Thus, when the chassis 12A, 12B are opened as illustrated in FIG. 2, adjacent edges 14Ac, 14Bc of the displays 14A, 14B come extremely close to each other.

The portable information device 10 will be described below on condition that the aligning direction of the chassis 12A, 12B is an X direction and the direction along the edges 12Ab, 12Bb is a Y direction as illustrated in FIG. 2. As for the X direction, a direction from one edge 12Ab to the other edge 12Ad of one chassis 12A may be called an X1 direction and a direction from one edge 12Bb to the other edge 12Bd of the other chassis 12B may be called an X2 direction.

Figure 3A:
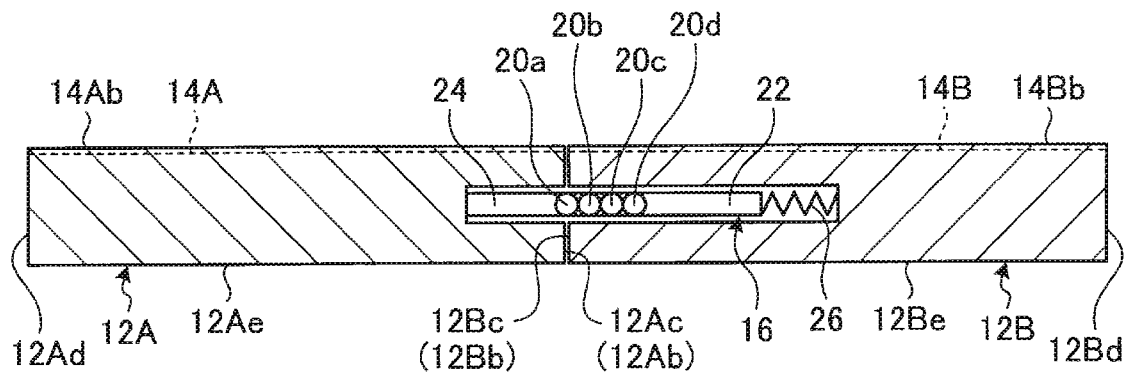
FIG. 3A is a side sectional view of a state where chassis are opened and put into a first usage form.
Figure 3B:
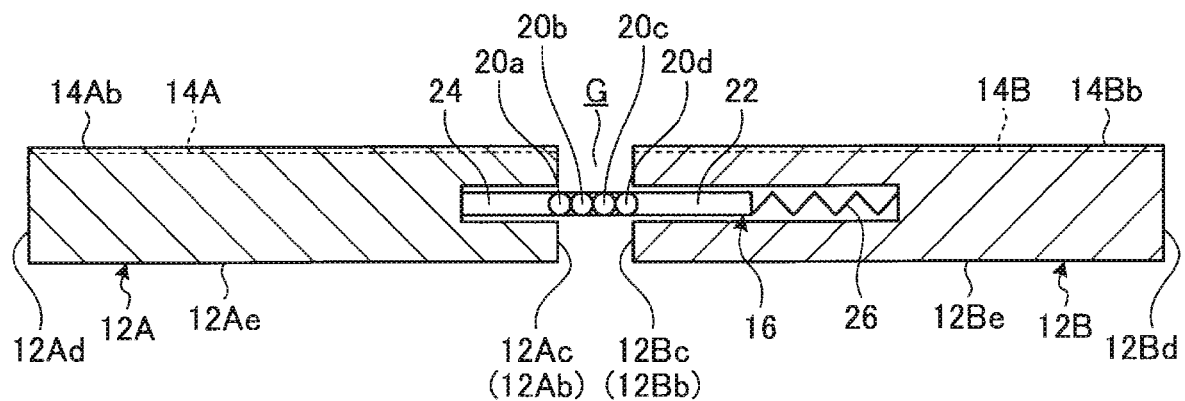
FIG. 3B is a side sectional view of a state where the chassis are separated from the state illustrated in FIG. 3A to slide a hinge mechanism.
Figure 3C:
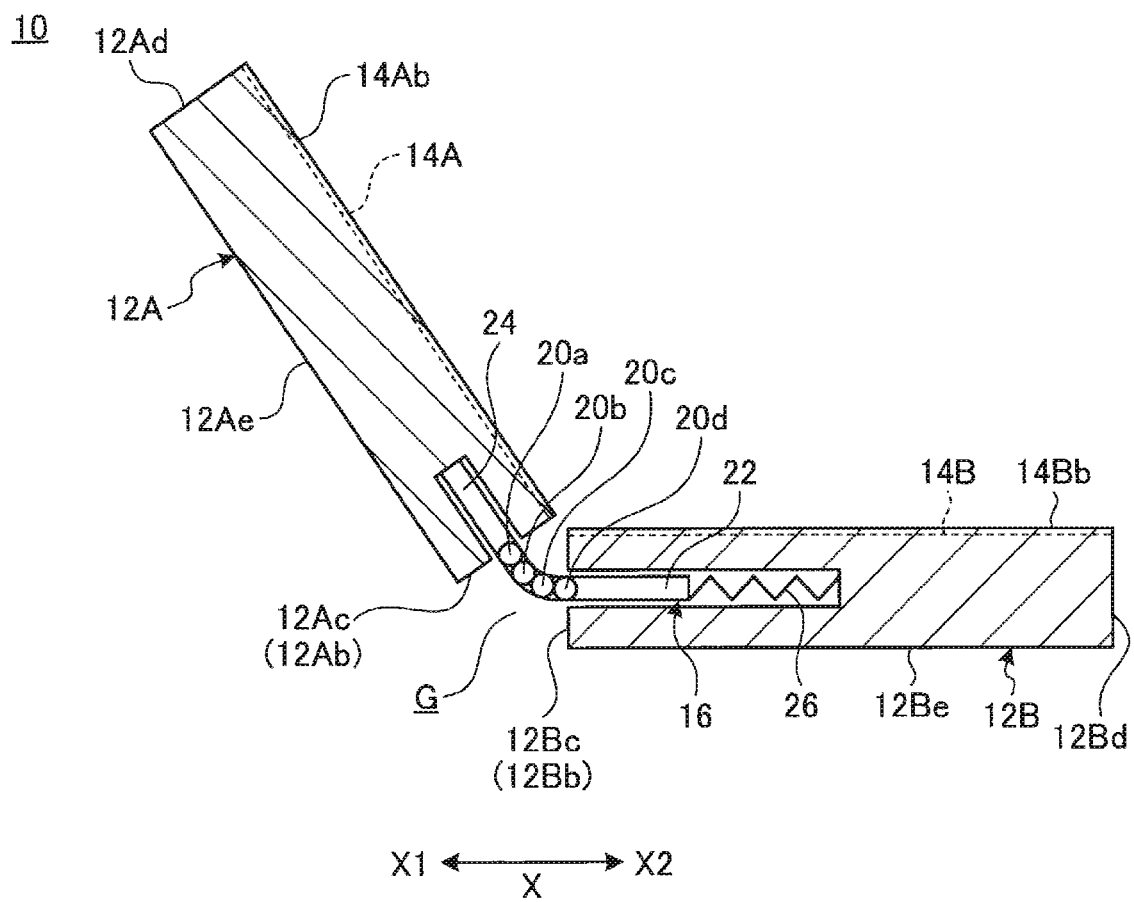
FIG. 3C is a side sectional view of a state where one chassis is rotated from the state illustrated in FIG. 3B and put into a second usage form.
Figure 3D:
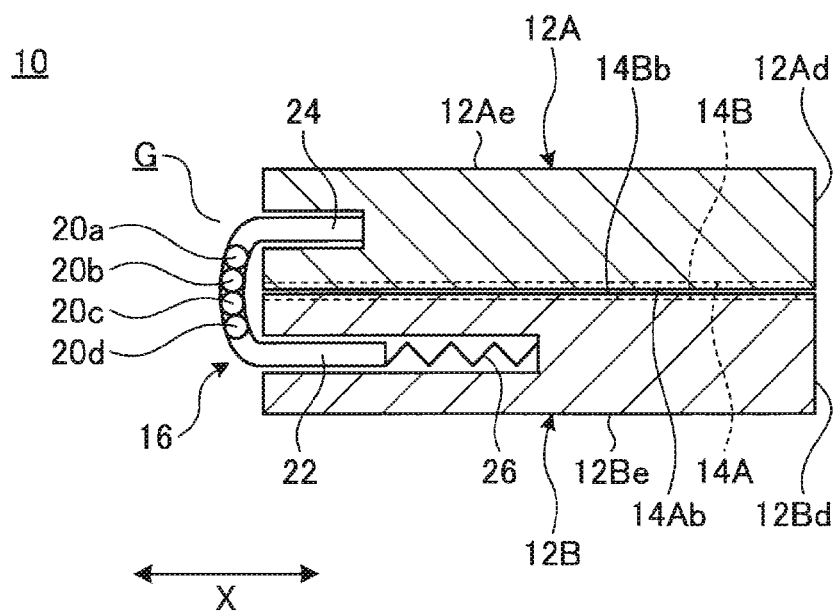
FIG. 3D is a side sectional view of a state where one chassis is closed on the other chassis from the state illustrated in FIG. 3C and put into a closed form.
Figure 3E:
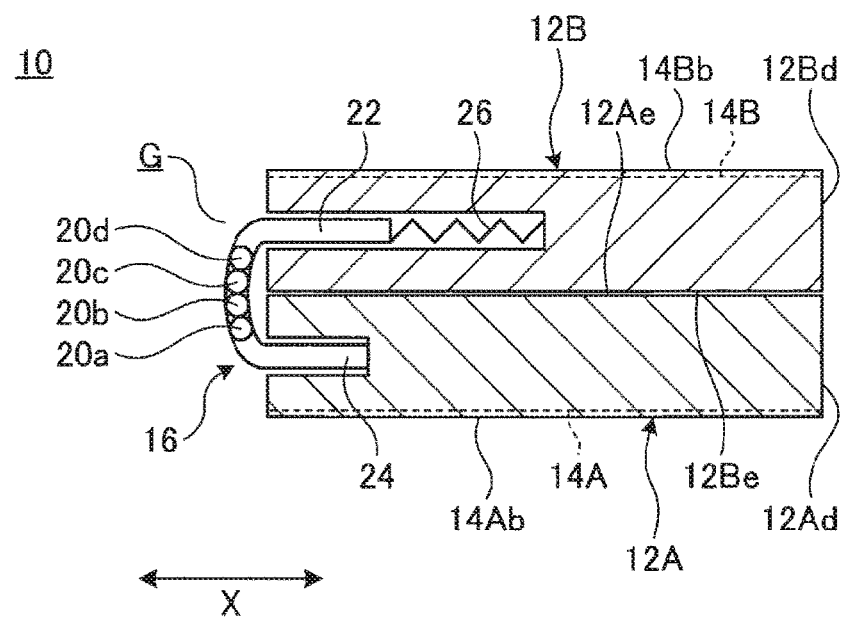
FIG. 3E is a side sectional view of a state where one chassis is rotated from the state illustrated in FIG. 3B to be arranged under the other chassis and put into a third usage form.
Figure 3F:
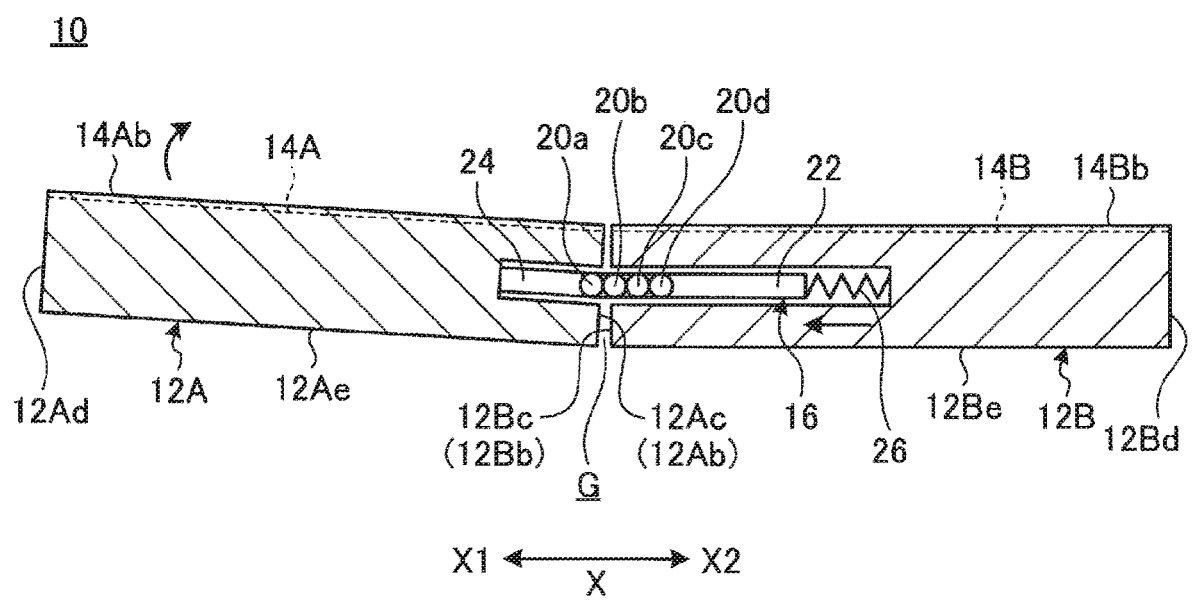
FIG. 3F is a side sectional view of a state where one chassis is slightly lifted up from the state illustrated in FIG. 3B.

The rotational motion of the chassis 12A, 12B by the hinge mechanisms 16 will be described. FIG. 3A to FIG. 3F are explanatory diagrams schematically illustrating the principle structure of each of the hinge mechanisms 16 of the embodiment and the rotational motion of the chassis 12A, 12B by the hinge mechanism 16. FIG. 3A illustrates a state where the chassis 12A, 12B are opened and put into a first usage form (flat plate form). FIG. 3B illustrates a state where the chassis 12A, 12B are separated from the state illustrated in FIG. 3A to slide the hinge mechanism 16. FIG. 3C illustrates a state where one chassis 12A is rotated from the state illustrated in FIG. 3B and put into a second usage form. FIG. 3D illustrates a state where one chassis 12A is closed on the other chassis 12B from the state illustrated in FIG. 3C and put into a closed form (folded form). FIG. 3E illustrates a state where one chassis 12A is rotated from the state illustrated in FIG. 3B to be arranged under the other chassis 12B and put into a third usage form (folded state). FIG. 3F illustrates a state where one chassis 12A is slightly lifted up from the state illustrated in FIG. 3B.

As illustrated in FIG. 3A to FIG. 3F, the hinge mechanism 16 includes a set of hinge shafts 20a, 20b, 20c, and 20d, a slide support part 22, a fixed support part 24, and an elastic member 26.

The hinge shafts 20a to 20d are small-diameter cylindrical rod members extending along the Y direction and lined up along the X direction. In the embodiment, such a structure that four hinge shafts 20a to 20d are coupled rotatably about the axis and capable of being revolving relative to one another is exemplified. The hinge mechanism 16 has just to have two or more hinge shafts.

The slide support part 22 is supported in a state of being slidable in the X direction with respect to one chassis 12B, and coupled rotatably to the hinge shaft 20d closest to the chassis 12B. The elastic member 26 is always urging the slide support part 22 toward the other chassis 12A side (X1 side). The elastic member 26 is, for example, a compression coil spring. The slide support part 22 is movable between a first position (see FIG. 3A) of being moved in a direction to be separated from the other chassis 12A and a second position (see FIG. 3B to FIG. 3E) of being moved in a direction to come close to the other chassis 12A. As will be described in detail later, the slide support part 22 is retained by a latch structure at the first position and the second position, respectively. The fixed support part 24 is fixed to the other chassis 12A and coupled rotatably to the hinge shaft 20a closest to the chassis 12A.

Next, such motion that the chassis 12A, 12B are rotated by the hinge mechanism 16 and changed to each form of the portable information device 10 will be described. In the first usage form illustrated in FIG. 3A, the portable information device 10 is in a tablet PC use mode (large-screen tablet mode) in which the respective chassis 12A, 12B are arranged side by side to form a flat shape, and the respective displays 14A, 14B are also lined up to form a single plate-like large screen. In this case, each of the hinge mechanisms 16 is such that the slide support part 22 is at the first position of being moved closest to the X2 side against the urging force of the elastic member 26, where the respective hinge shafts 20a to 20d are housed within the chassis 12A, 12B. Thus, the end faces 12Ac, 12Bc of the chassis 12A, 12B abut each other to form a one plate-like shape. As a result, the adjacent edges 14Ac, 14Bc of the displays 14A, 14B come very close to each other to form a large screen together. Since this enables a user to use the two displays 14A, 14B as one screen, the portable information device 10 can be used as a tablet PC having a large screen.

A case where the portable information device 10 is changed from the first usage form illustrated in FIG. 3A to the second usage form illustrated in FIG. 3C, that is, a laptop PC use mode (laptop mode) will be described. In this case, the chassis 12A is first moved in the direction to be separated from the chassis 12B as illustrated in FIG. 3B, and the slide support part 22 is moved to the X1 side relative to the chassis 12B. Then, the end faces 12Ac, 12Bc of the chassis 12A, 12B are separated to form a gap G so that the hinge shafts 20a to 20d will be exposed respectively from this gap G. Subsequently, the chassis 12A is rotated with respect to the chassis 12B through the hinge mechanism 16 and so placed that the angle between the chassis 12A, 12B will be about 90 to 140 degrees, for example. As a result, the portable information device 10 becomes the laptop mode in which one chassis 12A takes a standing angle posture with respect to the other chassis 12B. This enables the user to use the portable information device 10 as a laptop PC using a keyboard, for example, displayed on the display 14B of the chassis 12B on the main body side.

Note that if at least one of the hinge shafts 20a to 20d is exposed from the gap G in the state illustrated in FIG. 3B, the subsequent rotating motion will be possible depending on the conditions such as the thickness of the chassis 12A, 12B.

When the portable information device 10 is changed from the second usage form illustrated in FIG. 3C to the closed form illustrated in FIG. 3D, that is, a state where the display 14A, 14B are closed will be described. In this case, the chassis 12A is further rotated from the second usage form illustrated in FIG. 3C. Then, as illustrated in FIG. 3D, the portable information device 10 becomes a state where the chassis 12A, 12B are so folded that the displays 14A, 14B will face each other, that is, such a state that a clamshell is closed (at a 0-degree angular position). In this state, the portable information device 10 becomes the closed form in which the displays 14A, 14B are housed within the closed chassis 12A, 12B, respectively. Thus, the portable information device 10 can be carried or stored in such a state that the displays 14A, 14B are protected while downsizing the chassis 12A, 12B.

When the portable information device 10 is changed from the first usage form illustrated in FIG. 3A to the third usage form illustrated in FIG. 3E, that is, to a tablet PC use mode (small-screen tablet mode) in which the chassis 12A, 12B are folded. In this case, like in the case of the change to the laptop mode, the chassis 12A is first separated from the chassis 12B as illustrated in FIG. 3B. Then, the chassis 12A is rotated in a direction opposite to the laptop mode with respect to the chassis 12B through the hinge mechanism 16. Then, when the chassis 12A, 12B are so folded that outer sides 12Ae, 12Be opposite to the sides of the displays 14A, 14B face each other as illustrated in FIG. 3E, the portable information device 10 becomes a small-screen tablet mode in which the chassis 12A, 12B are arranged at a 360-degree angular position. Like in the closed form illustrated in FIG. 3D, this small-screen tablet mode is in a state where the chassis 12A, 12B are made compact, but the user can use either one of the displays 14A, 14B. Thus, the user can use the portable information device 10 as a small-screen tablet PC.

In the portable information device 10 of the embodiment, when the chassis 12A is slightly lifted up from the chassis 12B as illustrated in FIG. 3F during the first usage form illustrated in FIG. 3A, the retained state by the abovementioned latch part of the slide support part 22 is released. As a result, the slide support part 22 is pushed out toward the X1 side by the urging force of the elastic member 26. This enables the user to change the chassis 12A, 12B easily from the first usage form illustrated in FIG. 3A to the state illustrated in FIG. 3B, and hence high operability can be obtained.

Figure 4:
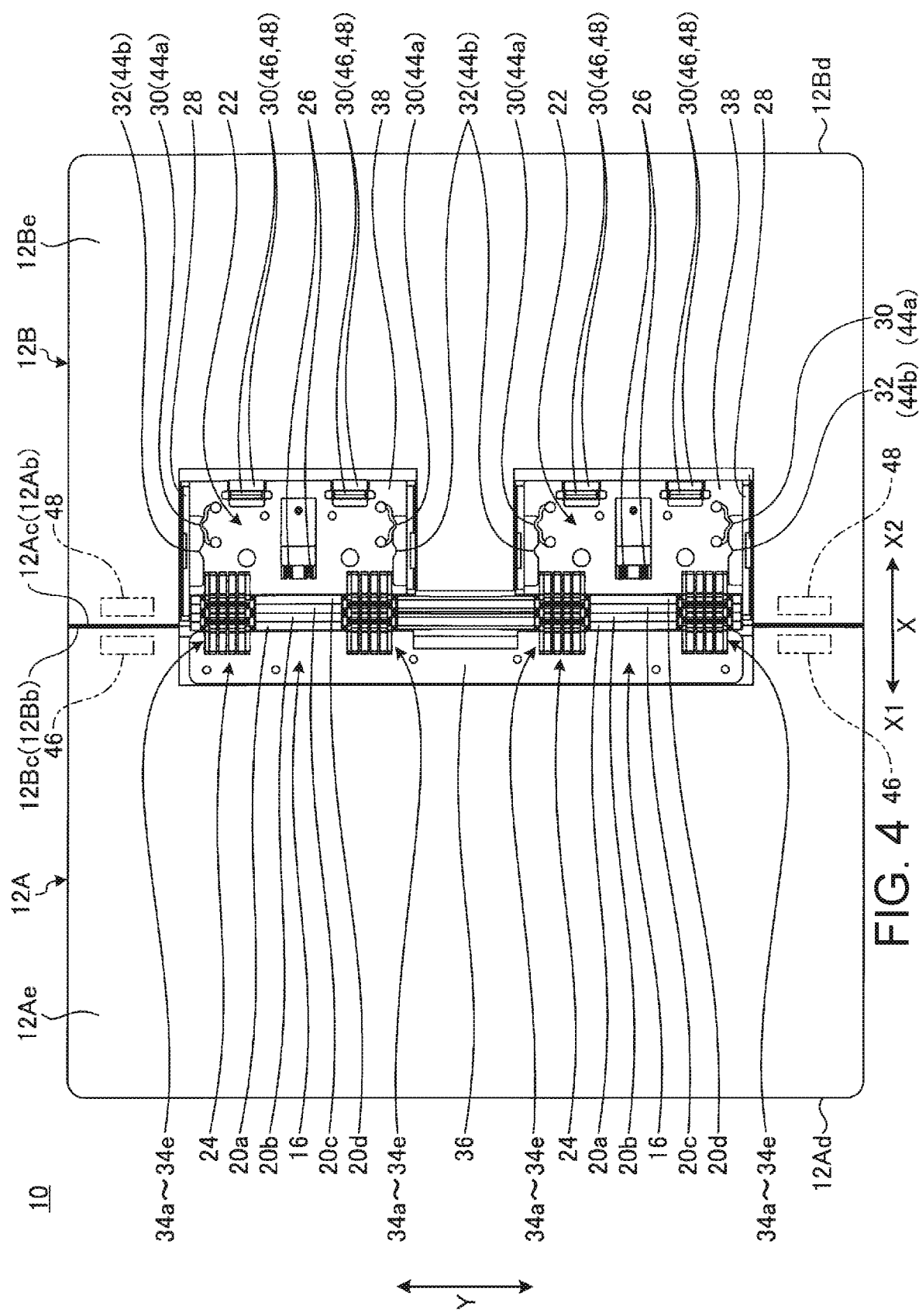
FIG. 4 is a plan view illustrating a state of hinge mechanisms in the first usage form illustrated in FIG. 3A.
Figure 5:
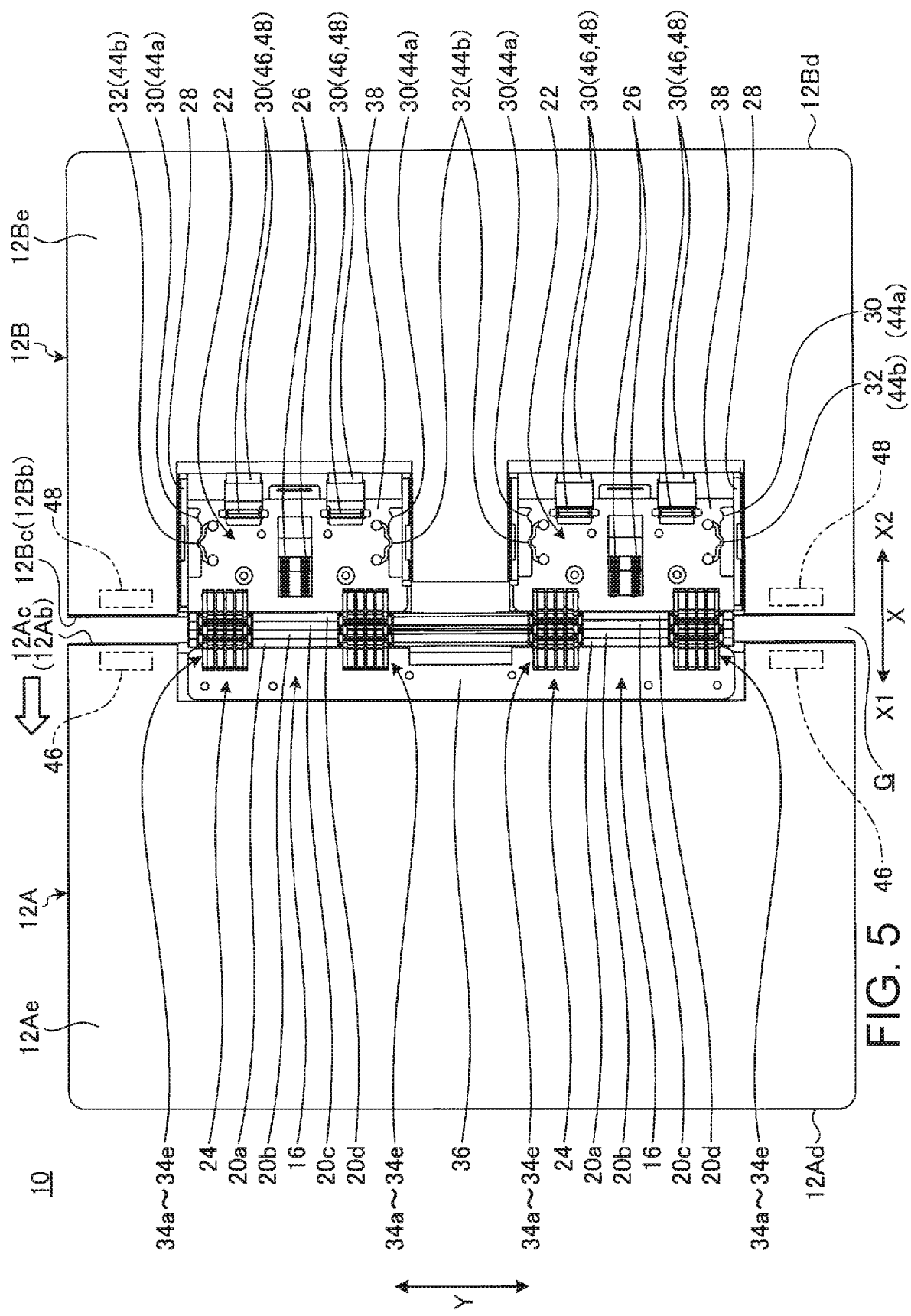
FIG. 5 is a plan view of a state where the chassis are separated from the state illustrated in FIG. 4 to slide the hinge mechanisms.
Figure 6:
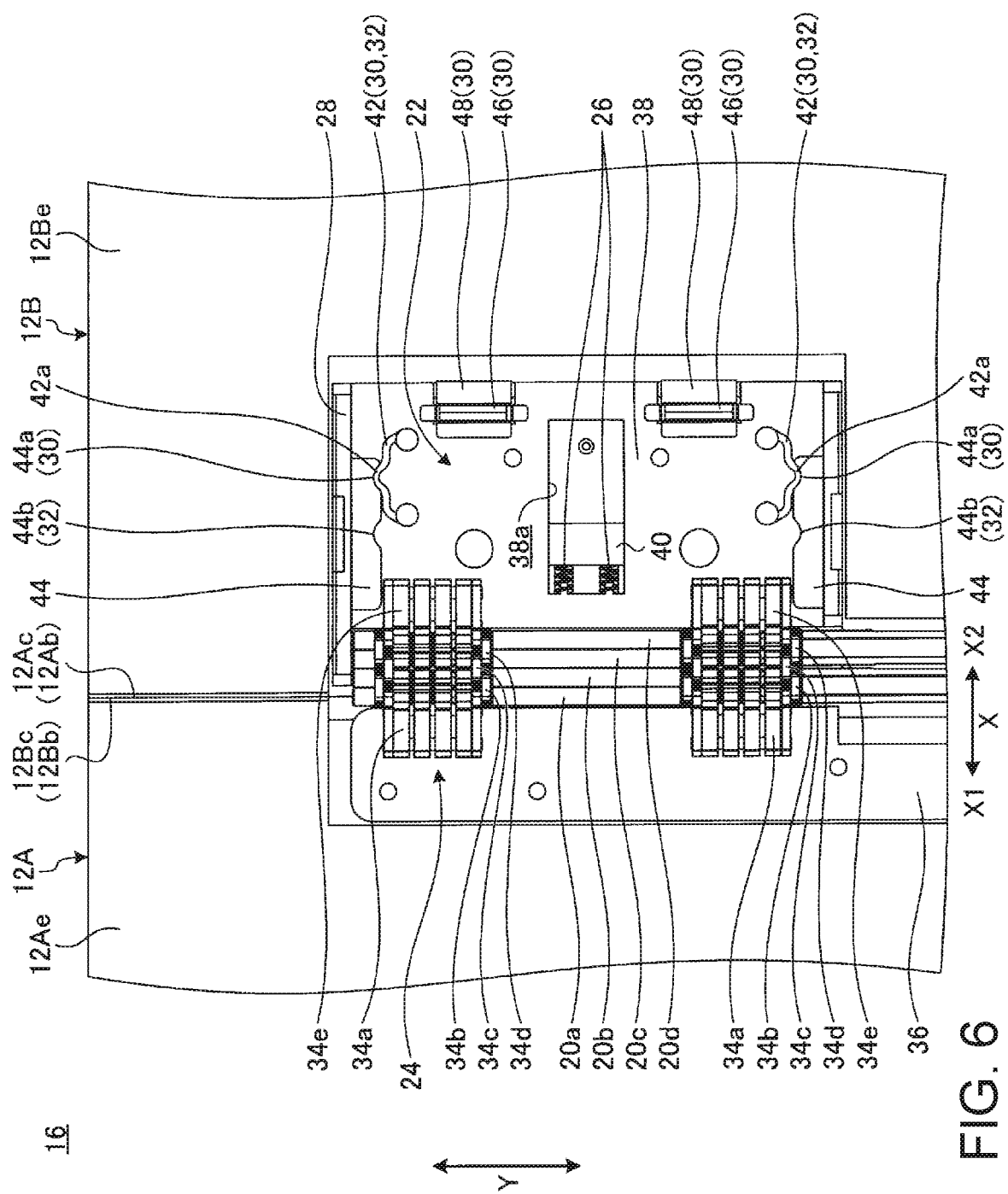
FIG. 6 is an enlarged view of the hinge mechanisms and the vicinity thereof illustrated in FIG. 4.
Figure 7:
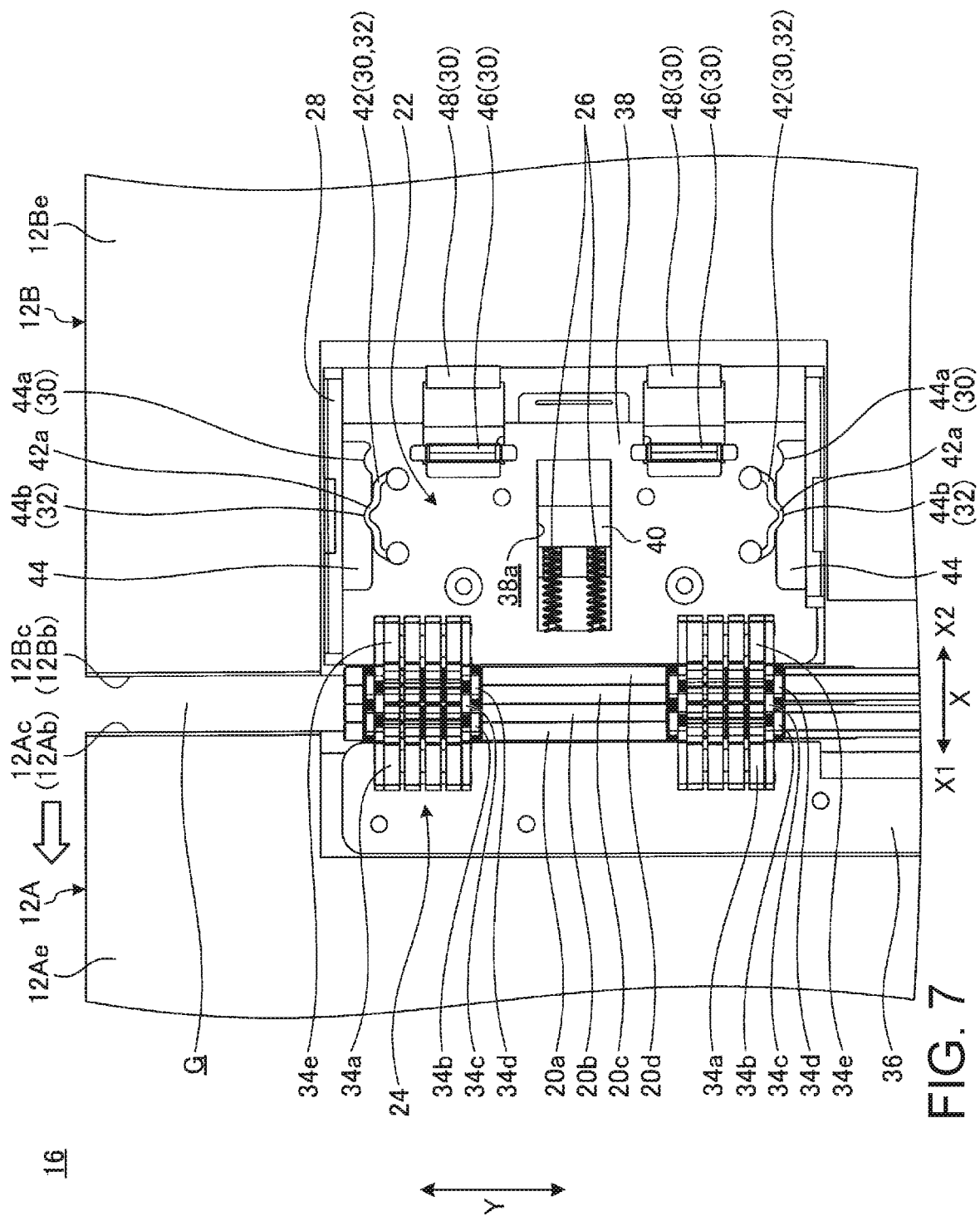
FIG. 7 is an enlarged view of the hinge mechanisms and the vicinity thereof illustrated in FIG. 5.
Figure 8:
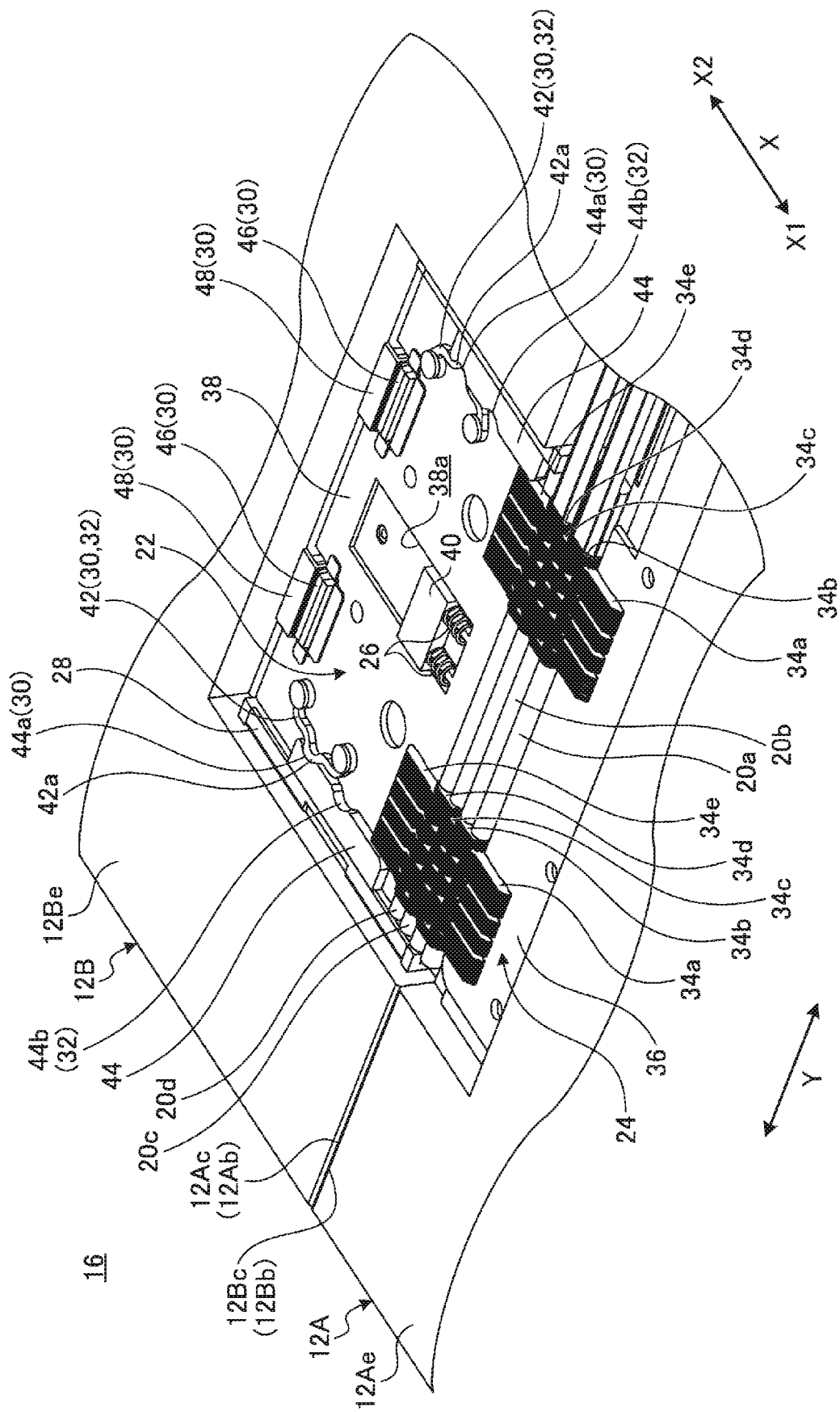
FIG. 8 is an enlarged perspective view of the hinge mechanisms and the vicinity thereof illustrated in FIG. 4.
Figure 9:
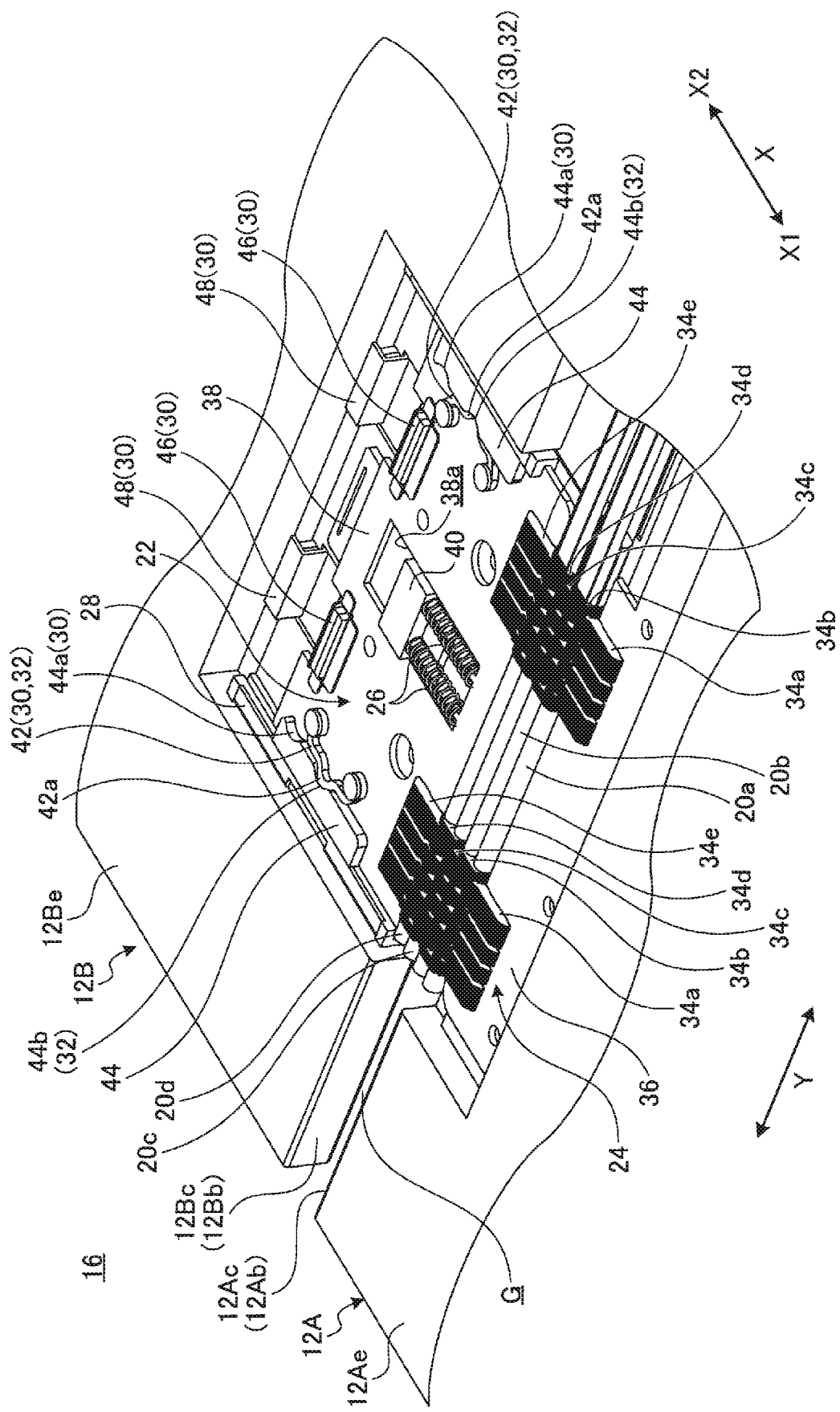
FIG. 9 is an enlarged perspective view of the hinge mechanisms and the vicinity thereof illustrated in FIG. 5.

Next, a specific structure example of the hinge mechanisms 16 will be described. FIG. 4 is a plan view illustrating a state of the hinge mechanisms 16 in the first usage form illustrated in FIG. 3A. FIG. 5 is a plan view of a state where the chassis 12A, 12B are separated from the state illustrated in FIG. 4 to slide the hinge mechanisms 16. FIG. 6 is an enlarged view of each of the hinge mechanisms 16 and the vicinity thereof illustrated in FIG. 4. FIG. 7 is an enlarged view of each of the hinge mechanisms 16 and the vicinity thereof illustrated in FIG. 5. FIG. 8 is an enlarged perspective view of each of the hinge mechanisms 16 and the vicinity thereof illustrated in FIG. 4. FIG. 9 is an enlarged perspective view of each of the hinge mechanisms 16 and the vicinity thereof illustrated in FIG. 5. In FIG. 4 to FIG. 9, the chassis 12A, 12B are illustrated as solid substances, and such a state that each of the hinge mechanisms 16 is arranged in a recess formed respectively in part of each of the chassis 12A, 12B is illustrated. Note, however, that each of the chassis 12A, 12B is a box body with the top opening closed by each of the display 14A, 14B, and the electronic parts 17 stored therein in the actual structure (see FIG. 10).

As illustrated in FIG. 4 to FIG. 9, each hinge mechanism 16 includes the hinge shafts 20a to 20d, the slide support part 22, the fixed support part 24, the elastic member 26, a bracket 28, a first retaining unit 30, and a second retaining unit 32. As illustrated in FIG. 4 and FIG. 5, respective hinge mechanisms 16 have a symmetrical structure with respect to a plane orthogonal to the X direction and the Y direction.

As illustrated in FIG. 6 to FIG. 9, the hinge shafts 20a to 20d are coupled by a plurality of connecting plates 34a to 34e stacked in the Y direction. The end of the connecting plate 34a on the X1 side is fixed to a fixed plate 36 of the fixed support part 24, and the end thereof on the X2 side rotatably supports the hinge shaft 20a. The connecting plate 34b couples the hinge shafts 20a, 20b to each other to rotatably support the hinge shafts 20a, 20b, respectively. The connecting plate 34c couples the hinge shafts 20b, 20c to each other to rotatably support the hinge shafts 20b, 20c, respectively. The connecting plate 34d couples the hinge shafts 20c, 20d to each other to rotatably support the hinge shafts 20c, 20d, respectively. The end of the connecting plate 34e on the X2 side is fixed to a slide member 38 of the slide support part 22, and the end thereof on the X1 side rotatably supports the hinge shaft 20d. Thus, the connecting plates 34a to 34e support the respective hinge shafts 20a to 20d rotatably about the axis, and couple the hinge shafts 20a to 20d in such a manner as to be able to revolve relative to one another. The connecting plates 34a to 34e are provided in both end portions of the hinge shafts 20a to 20d in the Y direction, respectively.

The slide support part 22 has the slide member 38 supported slidably with respect to the bracket 28. The bracket 28 is a plate member having walls formed at both edges thereof in the Y direction to stand up and extending in the X direction, respectively, which is fixed to the chassis 12B. The bracket 28 and the slide member 38 are metal plates made of aluminum, stainless, or the like, for example. The connecting plate 34e that supports the hinge shaft 20d closest to the X2 side is fixed to the slide member 38. Thus, the slide member 38 is slidable with respect to the chassis 12B in the X direction together with the hinge shafts 20a to 20d and the connecting plates 34a to 34e. Further, the slide member 38 supports the hinge shaft 20d through the connecting plate 34e in such a manner as to be relatively rotatable.

A rectangular guide hole 38a extending in the X direction is formed substantially at the center of the slide member 38. A guide block 40 and elastic members 26 are arranged inside the guide hole 38a. The guide block 40 is fixed to the bracket 28. Thus, the guide hole 38a slides against the guide block 40 to guide sliding of the slide member 38 in the X direction. The elastic members 26 are compression coil springs bridged between the inner surface of the guide hole 38a on the X1 side and the outer surface of the guide block 40 on the X1 side. The elastic members 26 are always urging the slide member 38 in the X1 direction against the bracket 28. Thus, the slide support part 22 has such a unit structure as to have the bracket 28 support the slide member 38. This increases the accuracy of the slide amount and slide direction of the slide member 38, and further makes it easy to do the work of assembling the chassis 12A, 12B.

The fixed support part 24 has the fixed plate 36 fixed to the chassis 12A. The connecting plate 34a supporting the hinge shaft 20a closest to the X1 side is fixed to the fixed plate 36. This enables the fixed plate 36 to slide in the X direction against the chassis 12B together with the slide member 38, the hinge shafts 20a to 20d, the connecting plates 34a to 34e, and the chassis 12A. Further, the fixed plate 36 supports the hinge shaft 20a through the connecting plates 34a in such a manner as to be relatively rotatable. In the case of the embodiment, the fixed plate 36 is a long plate extending between the pair of hinge mechanisms 16, 16, and shared by the fixed support part 24 of the respective hinge mechanisms 16 (see FIG. 4 and FIG. 5). A dedicated fixed plate 36 may also be used for each hinge mechanism 16, respectively.

The first retaining unit 30 is a mechanism for retaining the slide member 38 at a first position (see FIG. 6) of being slid closest to the X2 side to control such an incorrect action as to separate the chassis 12A, 12B from each other in use in the first usage form. The first retaining unit 30 has latch parts 42 and first engaging portions 44a respectively formed in engagement blocks 44. In the case of the embodiment, the latch parts 42 and the engagement blocks 44 are provided on both sides of the slide member 38 in the Y direction, respectively. These pairs of the latch parts 42 and the engagement blocks 44 form a symmetrical structure with respect to a plane orthogonal to the X direction and the Y direction.

Each latch part 42 is a leaf spring formed from a thin metal plate made or stainless or the like. The latch part 42 has an arcuate shape arranged along the X direction and having an engaging projection 42a formed at the center to project so as to face the outside of the slide member 38. Each engagement block 44 is a block made of metal or resin and fixed to the bracket 28. The engagement block 44 is provided to extend in the X direction, where a first engaging portion 44a is formed in an end portion on the X2 side, and a second engaging portion 44b is formed closer to the X1 side than the first engaging portion 44a. The first engaging portion 44a and the second engaging portion 44b are recessed portions each formed by denting the side edge of the engagement block 44 to be able to engage with the engaging projection 42a of the latch part 42. The pitch between the first engaging portion 44a and the second engaging portion 44b in the X direction is matched with the slide amount of the slide member 38. The first retaining unit 30 can retain the slide member 38 at the first position when the engaging projection 42a of the latch part 42 is engaged with the first engaging portion 44a.

The first retaining unit 30 further has magnets 46 and attracted bodies 48. A pair of a magnet 46 and an attracted body 48 are provided side by side in the Y direction. The magnet 46 is fixed to the slide member 38. The attracted body 48 is a magnet, an iron plate, or the like attractable to the magnet 46, which is fixed to the bracket 28. Alternatively, the magnet 46 may be provided on the bracket 28 and the attracted body 48 may be provided on the slide member 38. The first retaining unit 30 can retain the slide member 38 stably at the first position by the magnet 46 attracting the attracted body 48. The first retaining unit 30 may also be composed only of either one of the combination of the latch parts 42 and the first engaging portions 44a and the combination of the magnets 46 and the attracted bodies 48.

The second retaining unit 32 is a mechanism for retaining the slide member 38 at a second position (see FIG. 7) of being slid closest to the X1 side to control the occurrence of such an incorrect action that the chassis 12A, 12B come close to interfere with each other during rotation of the chassis 12A, 12B. The second retaining unit 32 has the latch parts 42 and the second engaging portions 44b formed in the engagement blocks 44, respectively. The second retaining unit 32 can retain the slide member 38 at the second position when the engaging projection 42a of each latch part 42 is engaged with each second engaging portion 44b.

Each of the retaining units 30, 32 may also be such that the latch parts 42 are provided on the bracket 28 and the engagement blocks 44 are provided on the slide member 38. Further, the magnets 46 and the attracted bodies 48 of the first retaining unit 30 may also be provided in positions to face the end faces 12Ac, 12Bc of the chassis 12A, 12B, or both may be combined (see the magnets 46 and the attracted bodies 48 indicated by two-dot chain lines in FIG. 4 and FIG. 5).

Thus, in such a hinge mechanism 16, when the portable information device 10 is put into the first usage form (large-screen tablet mode) illustrated in FIG. 3A, the slide member 38 is placed at the first position of being moved closest to the X2 side as illustrated in FIG. 4, FIG. 6, and FIG. 8. In this state, the engaging projection 42a of each latch part 42 that constitutes part of the first retaining unit 30 is engaged with each first engaging portion 44a, and each magnet 46 is attracting each attracted body 48. In other words, this state is such that the hinge mechanism 16 is so shrunk that the chassis 12A, 12B come closest to each other. In this case, the hinge shafts 20a to 20d are housed within the chassis 12A, 12B, respectively.

When the chassis 12A, 12B are rotated from the first usage form, the chassis 12A is moved in a direction to be separated from the chassis 12B. Then, the engaging projection 42a of each latch part 42 is disengaged from each first engaging portion 44a and each magnet 46 is moved away from each attracted body 48, respectively. Thus, the slide member 38 slides toward the X1 side by receiving the urging force of the elastic member 26, and the chassis 12A slides toward the X1 side at the same time to be separated from the chassis 12B. Then, when the engaging projection 42a of the latch part 42 is engaged with the second engaging portion 44b, the slide member 38 is retained at the second position by the second retaining unit 32. In other words, the hinge mechanism 16 is so stretched that the chassis 12A, 12B are most separated as illustrated in FIG. 3B, FIG. 5, FIG. 7, and FIG. 9. In this state, the hinge shafts 20a to 20d are exposed from the gap G formed between the chassis 12A, 12B.

Therefore, the portable information device 10 can be changed to the second usage form, the third usage form, or the closed form after that by rotating the chassis 12A, 12B appropriately through the hinge mechanism 16.

Note that the operation of separating the chassis 12A, 12B from the first usage form in the portable information device 10 of the embodiment can be performed only by lifting up the chassis 12A slightly from the chassis 12B as illustrated in FIG. 3F. In other words, when the chassis 12A, 12B are rotated somewhat from the state illustrated in FIG. 4, FIG. 6, and FIG. 8, a force of pulling apart the chassis 12A, 12B is applied to the chassis 12A, 12B to move the chassis 12A toward the X1 side against the chassis 12B. Thus, since the chassis 12A is separated slightly from the chassis 12B, the engaging projection 42*a* of the latch part 42 is disengaged from the first engaging portion 44*a* and the magnet 46 is moved from the attracted body 48. As a result, the slide member 38, that is, the chassis 12A automatically slides toward the X1 side by the urging force of the elastic member 26. This enables the user to separate the chassis 12A, 12B easily without using great power.

Figure 10:
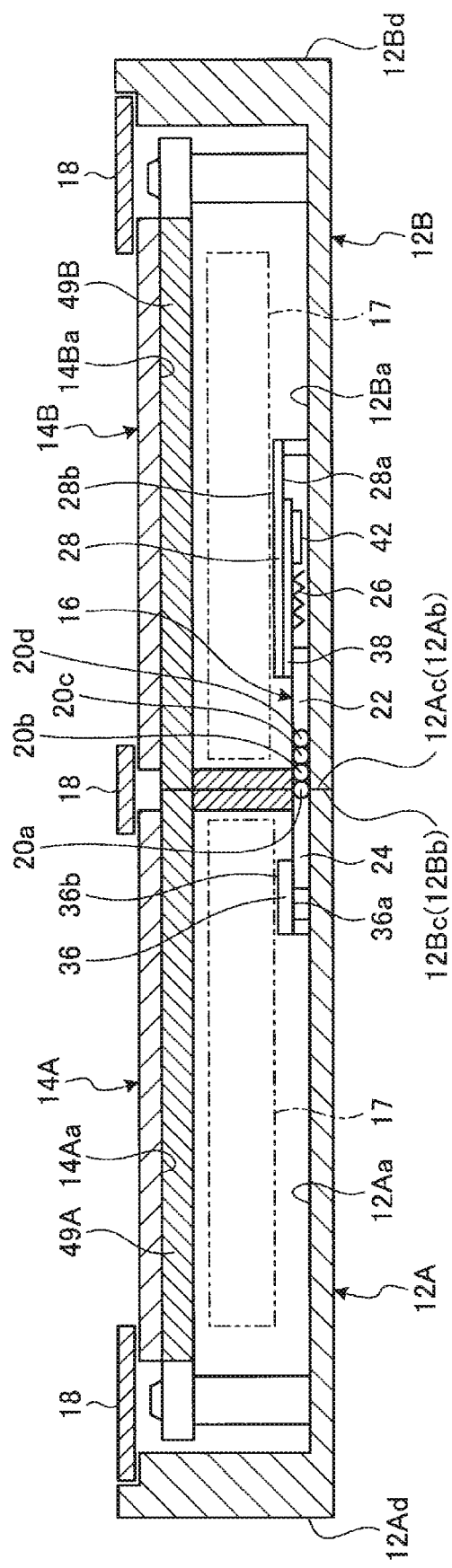
FIG. 10 is a side sectional view illustrating the internal structure of the portable information device from FIG. 1.

FIG. 10 is a side sectional view schematically illustrating the internal structure of the portable information device 10. As illustrated in FIG. 10, each of the hinge mechanisms 16 of the embodiment is such that the hinge shafts 20*a* to 20*d*, the connecting plates 34*a* to 34*e*, the slide member 38, the elastic member 26, the magnets 46, and the like are arranged on the bottom surfaces 28*a*, 36*a* of the bracket 28 and the fixed plate 36. In the embodiment, such a structure that the display 14A, 14B are supported on the top surfaces of support plates 49A, 49B attached to the chassis 12A, 12B is exemplified as illustrated in FIG. 10, but the mounting structure of the displays 14A, 14B may be any other structure.

Thus, the hinge mechanism 16 houses respective parts, such as the hinge shafts 20*a* to 20*d* that form an uneven shape and the slide member 38, between the bracket 28 and the fixed plate 36, and the inner surfaces 12Aa, 12Ba of the chassis 12A, 12B. On the other hand, top surfaces 28*b*, 36*b* of the bracket 28 and the fixed plate 36 are arranged in such a manner as to face bottom surfaces 14Aa, 14Ba of the display 14A, 14B. Thus, since a space without any uneven shape therein is formed between the top surfaces 28*b*, 36*b* as flat surfaces of the hinge mechanism 16 and the displays 14A, 14B, the electronic parts 17 and the like can be arranged efficiently in this space. Provided that the top surfaces 28*b*, 36*b* of the bracket 28 and the fixed plate 36 are the bottom surfaces, and the bracket 28 and the fixed plate 36 are placed on the inner surfaces 12Aa, 12Ba of the chassis 12A, 12B, the structure may also be such that the respective parts such as the hinge shafts 20*a* to 20*d* and the slide member 38 are arranged between the bottom surfaces 14Aa, 14Ba of the displays 14A, 14B, and the bracket 28 and the fixed plate 36.

Figure 11:
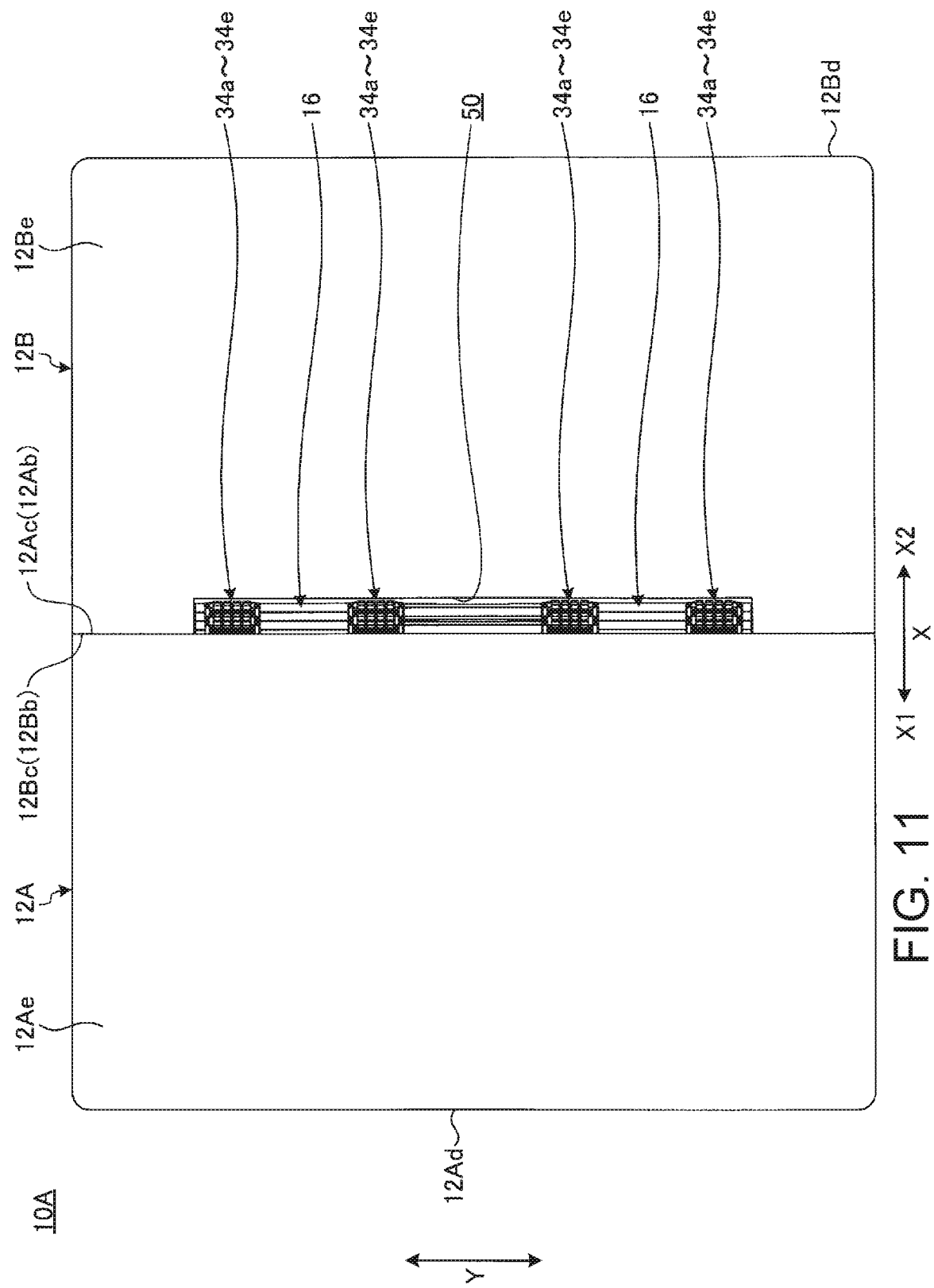
FIG. 11 is a plan view of a portable information device according to a variation in the first usage form as seen from the outer side.
Figure 12:
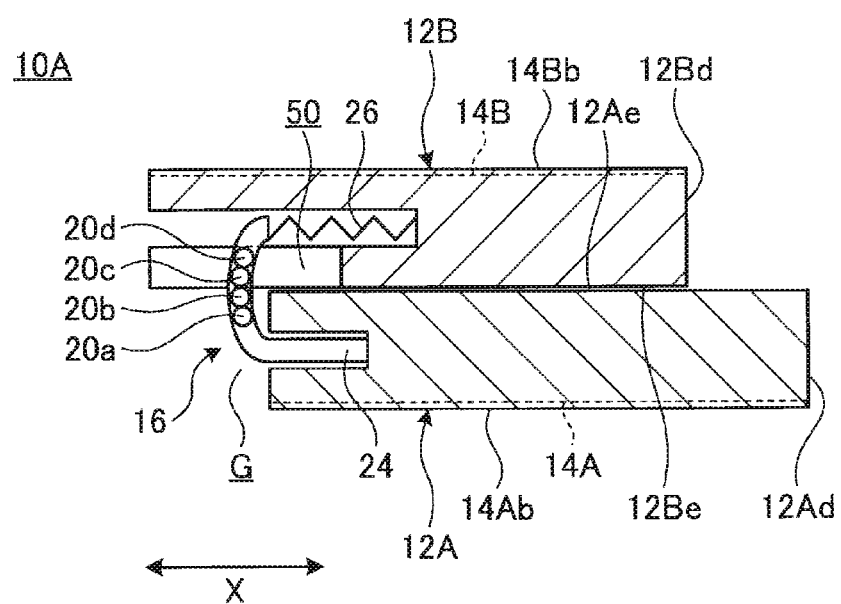
FIG. 12 is a side sectional view illustrating a state where the portable information device from FIG. 11 is changed to the third usage form.

FIG. 11 is a plan view of a portable information device 10A according to a variation in the first usage form as seen from the side of outer surfaces 12Ae, 12Be. FIG. 12 is a side sectional view schematically illustrating a state where the portable information device 10A illustrated in FIG. 11 is changed to the third usage form (small-screen tablet mode).

In the first usage form (large-screen tablet mode) illustrated in FIG. 11, this portable information device 10A includes an opening section 50 formed by cutting a section of the outer surface 12Be of the chassis 12B to overlap with the hinge shafts 20*a* to 20*d*. The opening section 50 is a notch-shaped section opening on the side of one edge 12Bb (end face 12Bc). Therefore, when the portable information device 10A is changed from the first usage form illustrated in FIG. 11 to the third usage form (small-screen tablet mode) illustrated in FIG. 12, there is no need to perform the operation of separating the chassis 12A, 12B as illustrated in FIG. 3B. Specifically, when the chassis 12A, 12B are rotated from the first usage form illustrated in FIG. 11 toward the third usage form illustrated in FIG. 12, since the hinge shafts 20*a* to 20*d* of each hinge mechanism 16 are rotated through the opening section 50 formed on the outer surface 12Be of the chassis 12B, the hinge shafts 20*a* to 20*d* do not interfere with the chassis 12B, respectively. Thus, the portable information device 10A further improves the operability when changing the mode.

As described above, the portable information device 10 of the embodiment includes the hinge mechanisms 16 which rotatably couple one edges 12Ab, 12Bb of the chassis 12A, 12B adjacent to each other to change the chassis 12A, 12B between the flat plate form, in which the displays 14A, 14B are arranged side by side, and the closed form or the third usage form as a folded from in which the displays 14A, 14B are laid one on top of another. Each of the hinge mechanisms 16 has two or more hinge shafts 20*a* to 20*d*, the slide support part 22 supported by the chassis 12B to be slidable in an aligning direction of the chassis 12A, 12B to support the hinge shaft 20*d* closest to the chassis 12B in a manner to be relatively rotatable, and the fixed support part 24 fixed to the chassis 12A to support the hinge shaft 20*a* closest to the chassis 12A in a manner to be relatively rotatable.

Thus, the portable information device 10 allows the hinge mechanisms 16 to slide properly according to the angular position between the chassis 12A, 12B to set the chassis 12A, 12B in positions to come close to each other or to be separated from each other. Therefore, in the flat plate form (first usage form) in which the chassis 12A, 12B are opened to arrange the displays 14A, 14B side by side as illustrated in FIG. 3A and FIG. 4, the portable information device 10 can make the chassis 12A, 12B come close to each other. Since this can cause the adjacent edges 14Ac, 14Bc of the displays 14A, 14B to come closest to each other to reduce the gap therebetween, the displays 14A, 14B can be used as one large screen without discomfort. Further, when such a flat plate form is changed to the folded form, the portable information device 10 allows the hinge mechanisms 16 to slide so as to separate the chassis 12A, 12B, thus enabling smooth rotation of the chassis 12A, 12B without interference with each other. Moreover, since each hinge mechanism 16 has a slide structure in the portable information device 10, there is no need to arrange the hinge mechanism 16 on the surface of the chassis 12A, 12B. In other words, since the hinge mechanism 16 does not overhang on the surface of the chassis 12A, 12B and hence not form an uneven shape, the chassis 12A, 12B can be made substantially thinner.

In this case, the chassis 12A, 12B have the planes on the adjacent end faces 12Ac, 12B, respectively, and in the flat plate form illustrated in FIG. 3A, the planes of the end faces 12Ac, 12Bc of the chassis 12A, 12B abut each other. Therefore, in the flat plate form, the chassis 12A, 12B can be made to come close to each other as much as possible, and hence the displays 14A, 14B can be made to come close to each other as much as possible.

In the portable information device 10, each of the hinge shafts 20*a* to 20*d* is arranged in a position to overlap with the chassis 12A, 12B in the flat plate form illustrated in FIG. 3A. Therefore, the chassis 12A, 12B can be made to come close to each other as much as possible. In addition, since the hinge shafts 20*a* to 20*d* are inconspicuous, the appearance quality is also improved. Further, in the folded form illustrated in FIG. 3D or FIG. 3E, the hinge shafts 20a to 20d are exposed from the gap G formed between the chassis 12A, 12B in the portable information device 10. Therefore, even when the adjacent end faces 12Ac, 12Bc of the chassis 12A, 12B are formed into places, the hinge mechanisms 16 can smoothly rotate the chassis 12A, 12B.

As has been described, the present invention provides an improved portable information device having a thinner chassis while reducing a gap between the displays.

The present invention is not limited to the above-mentioned embodiment, and changes can be made freely without departing from the gist of the present invention. For example, in the above description, the structure having the pair of chassis 12A, 12B and the pair of displays 14A, 14B is exemplified, but three or more chassis each having a display may be provided. Also, in the case of a three chassis structure, such a double-door structure that both side chassis are coupled to a center chassis using hinge mechanisms 16, respectively, may be adopted.

Further, in the above-mentioned description, such a structure that the chassis 12A, 12B are rotatable from the first usage form illustrated in FIG. 3A to the closed form illustrated in FIG. 3D and the third usage form illustrated in FIG. 3E is exemplified. However, the structure may be such that the chassis 12A, 12B is rotatable from the first usage form illustrated in FIG. 3A only to either the closed form illustrated in FIG. 3D or the third usage form illustrated in FIG. 3E.

While the invention has been particularly shown and described with reference to a preferred embodiment, it will be understood by those skilled in the art that various changes in form and detail may be made therein without departing from the spirit and scope of the invention.

What is claimed is:

1. A portable information device, comprising:
a first chassis having a first display;
a second chassis having a second display;
a hinge mechanism rotatably couples said first chassis to said second chassis, wherein said hinge mechanism includes:
a plurality of hinge shafts with axial directions provided along an aligning direction of said first and second chassis;
a slide support part, to be slidable along said aligning direction, is connected to one of said hinge shafts closest to said first chassis in a manner to be relatively rotatable; and
a fixed support part, fixed to said second chassis, is connected to one of said hinge shafts closest to said second chassis in a manner to be relatively rotatable;
wherein said hinge mechanism allows said first and second chassis to change between a flat-plate form in which said first and second displays are arranged side-by-side, and a folded form in which said first and second displays face each other.

2. The portable information device of claim 1, wherein, in said flat-plate form, said hinge mechanism is placed in a position where said hinge shafts overlap said chassis, while in said folded form, at least one of said hinge shafts is placed in a position to be exposed from a gap formed between edges of said first and second chassis.

3. The portable information device of claim 1, wherein the number of said hinge shafts is four.

4. The portable information device of claim 1, wherein said slide support part is connected to said first chassis via an elastic member, and said fixed support part is directly connected to said second chassis without any elastic member.

5. A portable information device, comprising:
a first chassis having a first display;
a second chassis having a second display, wherein said first and second chassis have planes on end faces of edges of said first and second chassis;
a hinge mechanism rotatably couples said first chassis to said second chassis, wherein said hinge mechanism includes:
a plurality of hinge shafts with axial directions provided along an aligning direction of said first and second chassis;
a slide support part, to be slidable along said aligning direction, is connected to one of said hinge shafts closest to said first chassis in a manner to be relatively rotatable; and
a fixed support part, fixed to said second chassis, is connected to one of said hinge shafts closest to said second chassis in a manner to be relatively rotatable;
wherein said hinge mechanism allows said first and second chassis to change between a flat-plate form in which said first and second displays are arranged side-by-side, and a folded form in which said first and second displays face each other.

6. The portable information device of claim 5, wherein, in said flat-plate form, said planes of said end faces of said first and second chassis abut each other.

7. The portable information device of claim 5, wherein the number of said hinge shafts is four.

8. The portable information device of claim 5, wherein said slide support part is connected to said first chassis via an elastic member, and said fixed support part is directly connected to said second chassis without any elastic member.

9. A portable information device, comprising:
a first chassis having a first display;
a second chassis having a second display;
a hinge mechanism rotatably couples said first chassis to said second chassis, wherein said hinge mechanism includes:
a plurality of hinge shafts with axial directions provided along an aligning direction of said first and second chassis;
a slide support part, to be slidable along said aligning direction, is connected to one of said hinge shafts closest to said first chassis in a manner to be relatively rotatable, wherein said slide support part includes a bracket fixed to said first chassis and a slide member supported to be slidable with respect to said bracket; and
a fixed support part, fixed to said second chassis, is connected to one of said hinge shafts closest to said second chassis in a manner to be relatively rotatable;
wherein said hinge mechanism allows said first and second chassis to change between a flat-plate form in which said first and second displays are arranged side-by-side, and a folded form in which said first and second displays face each other.

10. The portable information device of claim 9, wherein, in said flat-plate form, said slide member is placed at a first position moved in a direction to be separated from said second chassis, while in said folded form, said slide member is placed at a second position moved in a direction to come close to said second chassis.

11. The portable information device of claim 10, wherein said slide support part further includes a first retaining unit that retains said slide member at said first position, and a second retaining unit that retains said slide member at said second position.

12. The portable information device of claim 11, wherein said first retaining unit includes a latch part and a first engaging portion for engaging said latch part at said first position, said second retaining unit includes said latch part and a second engaging portion for engaging said latch part at said second position, and said latch part is in either one of said slide member and said bracket, and said first engaging portion and said second engaging portion are provided in said other of said slide member and said bracket.

13. The portable information device of claim 11, wherein said first retaining unit includes a magnet that shows attraction between said slide member and said bracket when said slide member is at said first position.

14. The portable information device of claim 9, wherein said slide support part is also connected to said first chassis via an elastic member, and said fixed support part is directly connected to said second chassis without any elastic member.

15. The portable information device of claim 9, wherein said bracket is a plate member, and one surface of said plate member becomes a supporting surface of said slide member and is arranged to face inner surfaces of said chassis, and said other surface thereof is arranged to face bottom surfaces of said first and second displays.

16. The portable information device of claim 9, wherein the number of said hinge shafts is four.

* * * * *